United States Patent [19]

Shahraray

[11] Patent Number: 6,055,025
[45] Date of Patent: Apr. 25, 2000

[54] METHOD AND APPARATUS FOR DETECTING ABRUPT AND GRADUAL SCENE CHANGES IN IMAGE SEQUENCES

[75] Inventor: Behzad Shahraray, Freehold, N.J.

[73] Assignee: Lucent Technologies, Inc., Murray Hill, N.J.

[21] Appl. No.: 08/171,136

[22] Filed: Dec. 21, 1993

[51] Int. Cl.$^7$ .................................................. H04N 7/18
[52] U.S. Cl. ........................................... 348/700; 348/420
[58] Field of Search ................................. 348/384, 700, 348/420, 413, 416, 699; H04N 7/18

[56] References Cited

U.S. PATENT DOCUMENTS

| | | | |
|---|---|---|---|
| 5,027,205 | 6/1991 | Avis et al. | 348/700 |
| 5,032,905 | 7/1991 | Koga | 348/700 |
| 5,034,816 | 7/1991 | Morita et al. | 348/700 |
| 5,099,322 | 3/1992 | Gove | 348/700 |
| 5,134,472 | 7/1992 | Abe | 348/700 |
| 5,179,449 | 1/1993 | Doi | 358/311 |
| 5,235,419 | 8/1993 | Krause | 348/700 |
| 5,265,180 | 11/1993 | Golin | 348/384 |

OTHER PUBLICATIONS

"Knowledge Guided Parsing in Video Databases", *Proc. SPIE Storage and Retrieval for Image and Video Databases* (SPIE vol. 1908), D. Swanberg et al., pp. 13–24, San Jose, Feb. 1993.

"Automatic Video Indexing and Full Video Search for Object Appearances", *Proc. 2nd Working Conference on Visual Database Systems* (Visual Database Systems II), A. Nagasaka et al., Ed. 64, E. Knuth and L.M. Wenger (Elsevier Science Publishers), pp. 113–127.

"Video Browsing Using Brightness Data", *Proc. SPIE Visual Communications and Image Processing* (VCIP '91), K. Otsuji et al., SPIE vol. 1606, pp. 980–989.

*Digital Pictures Representation and Compression, Applications of Communications Theory*, A. N. Netravali and Barry G. Haskell, 1988, Chapter 5, pp. 334–340.

*Primary Examiner*—Richard Lee

[57] ABSTRACT

A method is capable of detecting both abrupt and gradual scene changes. Consecutive frames of an image sequence (e.g., a video program) are first acquired and digitized. The images are subdivided into a plurality of rectangular regions. Block matching is performed between the current frame and the Dth previous frame to determine match signals that represent the likelihood that the regions of the first frame contain visual information substantially similar to respective matching regions of the second frame. The match signals are ordered beginning with the match signals defining the best match and ending with the match signals defining the worst match. The first S match signals are selected and averaged together, to obtain an instantaneous match (IM) signal S is user definable and is greater than zero and less than or equal to the number of regions into which each frame is divided. The IM signal provides a criteria for determining whether the first frame belongs to a scene different from the second frame. Finally, a scene change is indicated when the IM signal meets certain decision criteria.

27 Claims, 10 Drawing Sheets

METHOD AND APPARATUS FOR DETECTING ABRUPT AND GRADUAL SCENE CHANGES IN IMAGE SEQUENCES

TECHNICAL FIELD

This invention relates to a method and apparatus for automatically detecting scene changes in image sequences such as a video program.

BACKGROUND

Video programs are generally formed from a compilation of different scenes. Each scene contains visual information that is closely related in content. In turn, each scene is composed of a series of frames. As used herein the term "frame" is used interchangeably with the term "image".

The transition between two scenes can be accomplished in different ways. The most straightforward transition is an abrupt transition that occurs between adjacent frames in a sequence of frames. This type of transition is referred to as a "butt-edit" transition and is defined by a single point in the sequence of frames forming the two scenes. Rather than an abrupt transition, a gradual transition that occurs over two or more frames can be accomplished by gradually decreasing the contrast of the final frames of a scene to zero (i.e., fade-out), and then gradually increasing the contrast of the next scene from zero to its nominal level (i.e., fade-in). If one scene undergoes fade-out while a different scene simultaneously undergoes fade-in (i.e., dissolve, blend), the transition will be composed of a series of intermediate frames having picture elements which are a combination of the corresponding picture elements from frames belonging to both scenes. In contrast to an abrupt transition, a dissolve or blend provides no well-defined breakpoint in the sequence separating the two scenes.

In addition to the transition categories mentioned above, other types of transitions can be produced by digital editing machines. These transitions, which may be produced by various editing modes of the machines, may yield the following effects: a second scene gradually shifts out a previous segment (vertically or horizontally); the second scene unrolls and covers the previous scene (from the top, side, or corner); the previous scene shrinks to uncover the second scene; the second scene begins at a reduced size on top of the previous scene and expands to cover the previous scene because the variety of editing modes are numerous and increasing, it is not possible to list herein all the possible variations. However, one feature they all have in common is that they produce transitions between adjacent video segments that are not well-defined. Such transitions will be classified as gradual scene changes.

Known methods of detecting scene changes include a variety of methods based on gray-level histograms and in-place template matching. Such methods may be employed for a variety of purposes such as video editing and video indexing to organize and selectively retrieve video segments in an efficient manner. Examples of known methods are disclosed in U.S. Pat. No. 5,179,449 and the work reported in Nagasaka A., and Tanaka Y., "Automatic Video Indexing and Full Video Search for Object Appearances," Proc. 2nd working conference on visual database Systems (Visual Database Systems II), Ed. 64, E. Knuth and L. M. Wenger (Elsevier Science Publishers, pp. 113–127); Otsuji K., Tonomura Y., and Ohba Y., "Video Browsing Using Brightness Data," Proc. SPIE Visual Communications and Image Processing (VCIP '91) (SPIE Vol. 1606, pp. 980–989), Swanberg D., Shu S., and Jain R., "Knowledge Guided Parsing in Video Databases," Proc SPIE Storage and Retrieval for Image and Video Databases (SPIE Vol. 1908, pp. 13–24) San Jose, February 1993. These known methods are deficient because they are unable to detect gradual transitions or scene cuts between different scenes with similar gray-level distributions. Moreover, these methods may generate false detections in the presence of rapid motion and they do not detect abrupt scene changes.

SUMMARY

In accordance with this invention, a method and apparatus for detecting scene changes in video programs has been developed. In contrast to prior scene change detectors, the present invention is capable of detecting both abrupt and gradual scene changes.

In one example of the invention, consecutive frames of an image sequence (e.g., a video program) are acquired and digitized. The images are subdivided into a plurality of rectangular regions. Block matching is performed between the current frame and the Dth previous frame to determine match signals that represent the likelihood that the regions of the first frame contain visual information substantially similar to respective matching regions of the second frame. The match signals are ordered beginning with the match signals defining the best match and ending with the match signals defining the worst match. The first S match signals are selected and averaged together, to obtain an instantaneous match (IM) signal S is user definable and is greater than zero and less than or equal to the number of regions into which each frame is divided. The IM signal provides a criteria for determining whether the first frame belongs to a scene different from the second frame. Finally, a scene change is indicated when the IM signal meets certain decision criteria.

In another example of the invention, the IM signal is temporally filtered to produce a cumulative match (CM) signal before a scene change is indicated. As a result, gradual scene changes can be detected. The temporal filtering may be accomplished with a digital filter such as a modified first order infinite-impulse-response digital filter having a variable gain less than less unity. In this case a scene change is indicated when both the IM and the CM signals meet certain decision criteria.

The output signal produced by the present invention, which indicates the location of those frames in a sequence of frames where scene changes have occurred, may be used in any application that is desired. Such applications include indexing the beginning of a new scene and retaining the first (or some other) frame from a new scene to represent the contents of the scene.

These are only a few examples of the invention. The full scope of the invention entitled to an exclusionary right is set forth in the claims at the end of this application.

BRIEF DESCRIPTION OF THE DRAWINGS

FIG. 5(*b*) shows an example of the behavior of the instantaneous match signal in the presence of fade-out.

FIG. 5(*c*) shows one example of the behavior of the instantaneous match signal in the presence of a gradual scene change.

FIG. 6(*b*) is a state diagram showing a decision module with its two states and the transitions therebetween utilizing only the instantaneous match signal.

FIG. 6(*c*) is a state diagram for an alternative decision module utilizing the instantaneous match signal and the image contrast signal.

DETAILED DESCRIPTION

Figure 1:
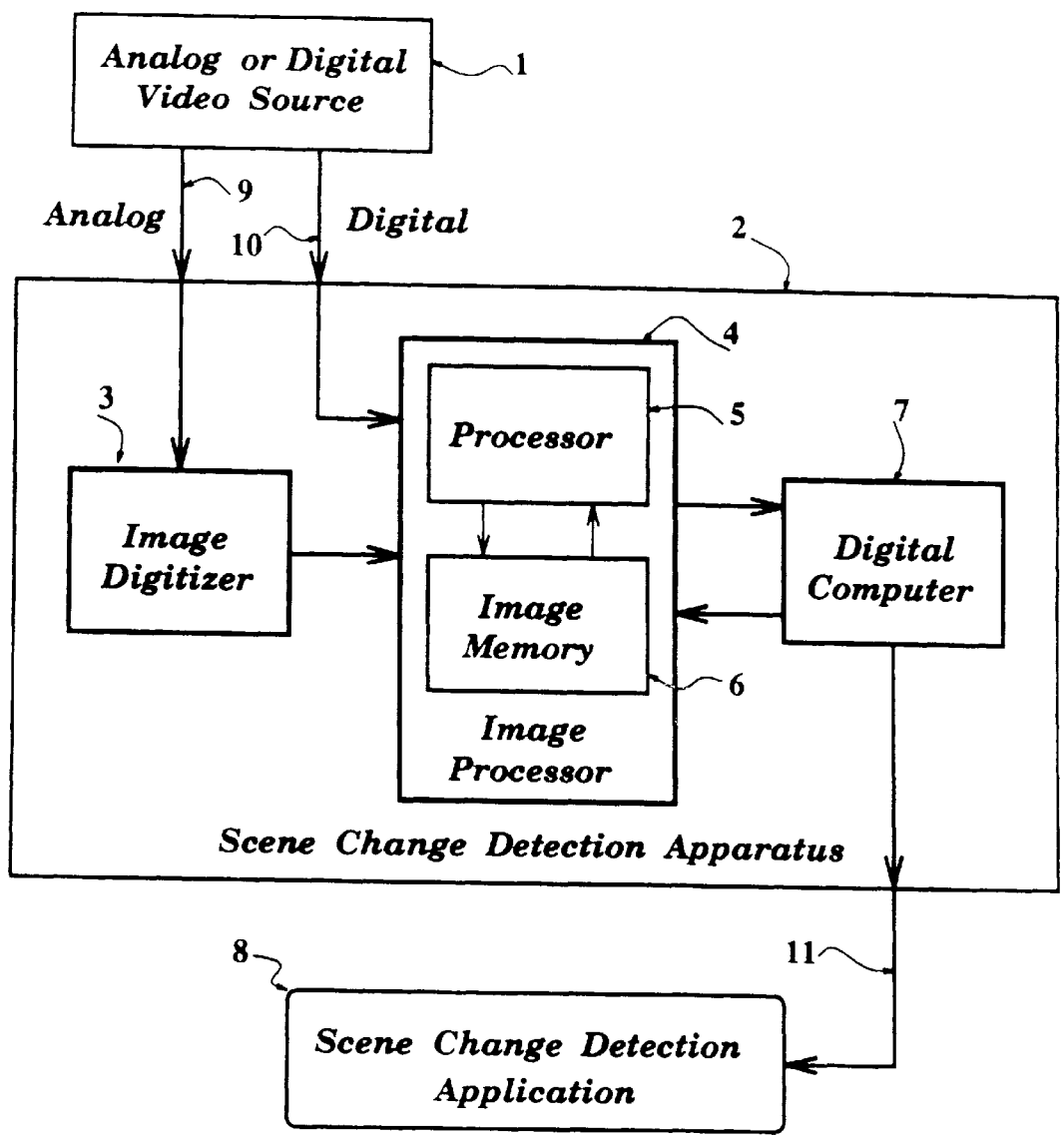
FIG. 1 is a block diagram of a video source and an application output coupled to the scene change detector in accordance with the present invention.
Figure 2:
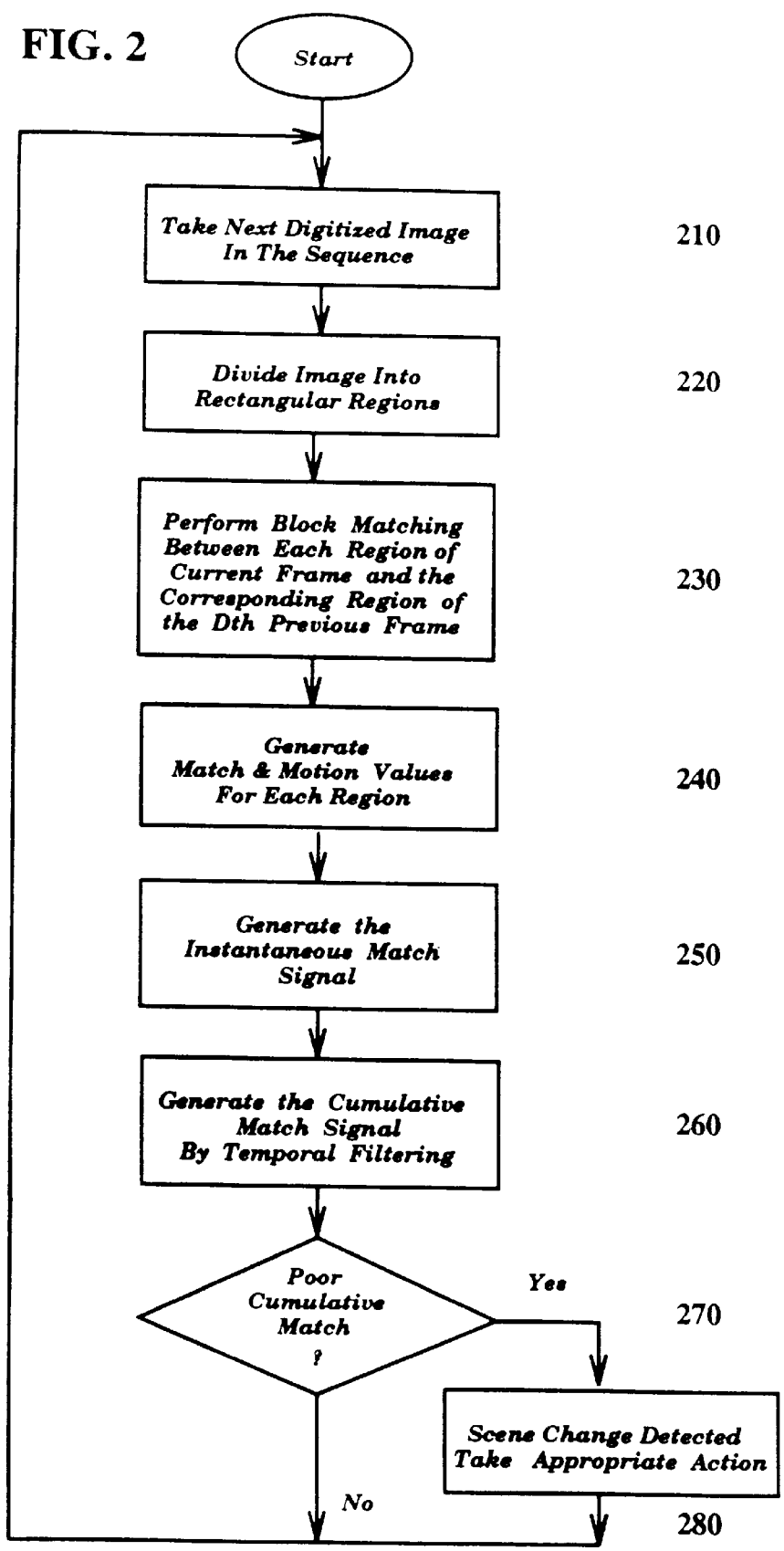
FIG. 2 is a flow chart illustrating the primary steps of the scene change detection method in accordance with the present invention.

FIG. 1 shows a block diagram of the scene change detector 2 of in accordance with one example of this invention. The detector 2 includes an image digitizer 3, an image processor 4, and a digital computer 7. The image processor 4 includes an image memory 6 for holding digitized images of current and previous frames and for storing intermediate results produced by the image processor 4. The image processor 4 also includes a processor 5 to process the images contained in the image memory 6. In an alternative example of the invention, the digital computer 7 performs the tasks of the image processor 4, thus eliminating the need for a separate image processor 4. FIG. 2 is a flowchart representing one example of the steps of the present invention as described below which may be implemented in the digital computer 7.

The input to the detector 2 is supplied by an analog or digital video source 1 such as a video cassette recorder or a television tuner. The video source 1 is not limited to any particular video standard and may, for example, also include any other source of visual information such as a computer memory or disk which stores image sequences. More generally, the video source may be any source sequence whatever that supplies visual information-bearing frames. If the video source 1 supplies an analog input, the input is first directed to the image digitizer 3. If the video source 1 supplies a digital input, the input is sent directly to the image processor 4. The output of the scene change detector 2 is a scene detection signal 11 which is sent to a scene change detection application, which may include a range of applications such as video editing and video indexing.

One component of this invention involves the procedure for measuring the similarity (or dissimilarity) between two frames. In the simplest case, a frame containing visual information (referred to herein as the template image) may be easily compared to a set of frames, at least one of which is a duplicate of the template frame, by determining the difference between the two frames on a point-by-point (i.e., pixel-by-pixel) basis. In other words, a certain visual characteristic such as intensity or color of the template image is compared to a corresponding characteristic of each of the frames in the set of frames. The frame for which the difference in the visual characteristic is zero for all points in the frames is the duplicate frame.

The matching process is made more complex if the duplicate frame is shifted with respect to the template frame. In this case, point-by-point matching of the template frame with the duplicate frame will result in a difference frame having large pixel values since the pixels in the template image are not being compared against the appropriate pixels in the duplicate frame. A good match, however, can be made by shifting the template frame by the same amount as the duplicate frame. This matching process requires that the difference frame be computed for many different positions of the template frame to find the position at which the difference in the visual characteristic being measured is a minimum. This method not only establishes the match between the two frames, but also calculates a motion vector that defines the magnitude and direction of the shift of the duplicate frame relative to the template frame. This method is referred to as "motion-based template matching".

Motion-based template matching is effective when the entire contents of the frame undergoes the same translational motion between the template frame and the duplicate frame. This situation arises, for example, when the sequence of frames contain a static scene recorded by a camera undergoing a pan and/or tilt motion. In contrast, when a visual sequence is produced by a camera recording a dynamic scene, the combination of camera motion and the motion of the objects in the scene results in different regions of the frame moving by differing amounts and in differing directions. In such cases, a single motion vector cannot describe the relationship between a template frame and a subsequent frame in the sequence and hence it is difficult to establish a good match.

The problem of comparing a sequence of frames that record a dynamic scene can be solved by dividing each of the frames into several "regions" or "blocks" (performed in step 220 in the example of the invention shown in FIG. 2) and performing the motion-based template matching on each block independently. In the field of image processing this procedure is known as "block matching". Block matching procedures (performed in step 230 in the example of the invention shown in FIG. 2) are disclosed in "Digital Pictures, Representation and Compression", by Arun N. Netravali and Barry G. Haskell, Plenum Press, 1988.

The following discussion of the formulation of exhaustive block matching between two frames $I_1$ and $I_2$ (indicated in FIG. 3 by reference numerals 12 and 13, respectively) will facilitate the discussion below.

Figure 3:
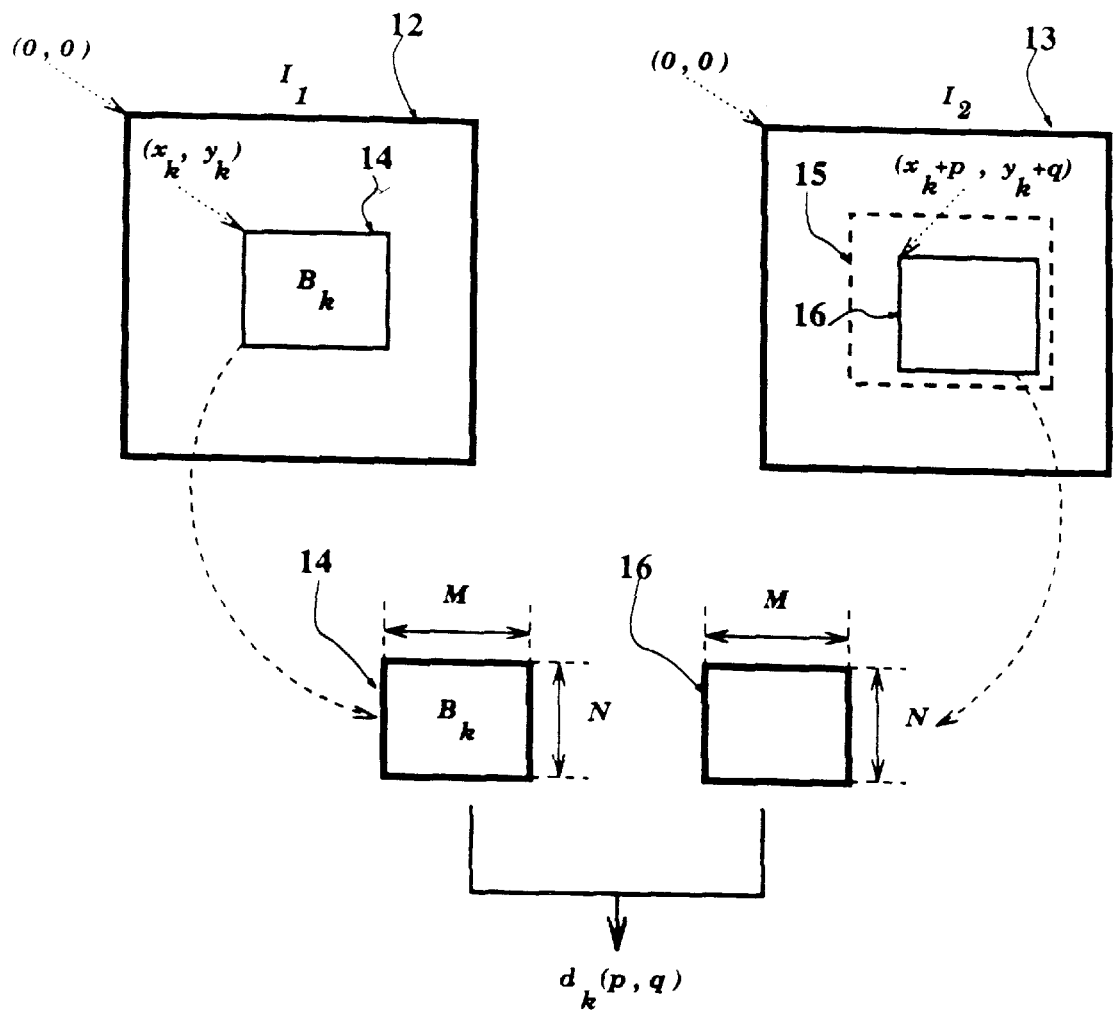
FIG. 3 is a diagram illustrating block matching performed between two frames.

In FIG. 3, let $B_k$ be the kth rectangular block of size M times N of frame 12 with its origin at $(x_k, y_k)$ in frame 12. Let I(i,j) denote the value of a visual characteristic (e.g., intensity or color) of a pixel of a frame at location (i,j) with respect to the origin the frame. The match distance of $B_k$ from a region of similar dimensions in a subsequent frame 13 with its origin at $(x_k, y_k)$ in frame is denoted by $d_k(0,0)$, and is defined as, $$d_k(0, 0) = \sum_{i=0}^{M-1} \sum_{j=0}^{N-1} |I_1(x_k + i, y_k + j) - I_2(x_k + i, y_k + j)|. \quad (1)$$

In other words, $d_k(0,0)$ denotes the match distance of $B_k$ a region in frame 13 that corresponds in size and location to region $B_k$ in frame 12.

The match distance may be generalized as follows to define a region in frame 13 that corresponds in size, but not location, to region $B_k$ in frame 12. In this case, the match distance of $B_k$ from a region in frame 13 having its origin at a point in frame 13 which is spaced a distance from $(x_k, y_k)$ by a vector $(p,q)$ is given by, $$d_k(p, q) = \sum_{i=0}^{M-1} \sum_{j=0}^{N-1} |I_1(x_k + i, y_k + j) - I_2(x_k + p + i, y_k + q + j)|. \quad (2)$$

If the region of frame 13 which is covered by $B_k$ when its origin is placed at $(x_k+p, y_k+q)$ is identical to $B_k$, the match distance is zero. If the visual characteristic of $B_k$ is not identical to that in the region of frame 13 to which it is being compared, the differences between the values of corresponding pixels of the two regions cause the value of the match distance $d_k(p,q)$ to increase.

The block matching process is based on the assumption that there is a restricted range of motion between frames (i.e., the objects appearing in the frames move by a relatively small amount between closely-spaced frames). In other words, a given region in the template frame is assumed to be in a position near its corresponding location in the frame to which it is being compared.

The following two steps are performed in the block matching process. First, the match distance $d_k(p,q)$ is computed for all positions $(p,q)$ in a rectangular region of size $(2P+1)$ times $(2Q+1)$ centered at $(x_k, y_k)$. This results in a list of $(2P+1)(2Q+1)$ different values of $d_k$. Next, the set of $d_k$ values is searched for the minimum value. Let the minimum match distance be denoted by $$d_k^{Min} = d_k(mx_k, my_k), \quad (3)$$

where $mx_k$ and $my_k$ are the x and y components of a motion vector indicating the location (within a restricted area 15) in frame 13 at which the block in frame 13 forms the best match. While the minimum match distance $d_k^{Min}$ provides information concerning the quality of the match at that position which is useful for many applications such as motion-based image coding, it also has some undesirable properties which make it less attractive for region-based image matching. For these purposes, the present invention has determined that a better criterion for determining whether two images match is provided by a normalized version of the minimum match distance rather than the minimum match distance itself. The normalization is accomplished as follows.

Let $d_k^{Avg}$ denote the average of all the $(2P+1)(2Q+1)$ match distance values. That is, $$d_k^{Avg} = \frac{1}{(2P+1)(2Q+1)} \sum_{p=-P}^{P} \sum_{q=-Q}^{Q} d_k(p, q). \quad (4)$$

Then the region-based match coefficient for block $B_k$ is denoted by $r_k$ and is defined as, $$r_k = \begin{cases} \dfrac{d_k^{Min}}{d_k^{Avg}} & \text{if } d_k^{Avg} > 0 \\ 1 & \text{if } d_k^{Avg} = 0 \end{cases} \quad (5)$$

As noted above, the normalized match coefficient $r_k$, which is determined in step 240 in the example of the invention shown in FIG. 2, provides a better criterion for measuring the degree of match than $d_k^{Min}$. One reason for this is that $r_k$ is a much better discriminant of strong matches involving high contrast regions, and weak matches between low contrast regions. For example, when two dissimilar regions have very low contrast and relatively similar average gray-levels (e.g., two uniformly dark regions), $d_k^{Min}$ will be small, indicating a good match between the regions. The value of $d_k^{min}$ is small because the relatively small pixel values give rise to small differences at the location of best match. However, $d_k^{Avg}$ also will be small because the lack of sufficient contrast results in smaller values of $d_k$ at points other than the point corresponding to $d_k^{Min}$. As a result, the match coefficient $r_k$ will be large. In this case the division by $d_k^{Avg}$ de-emphasizes the similarity of the regions. On the other hand, when two similar regions have relatively high contrast, a rapid rise in the value of $d_k$ occurs when moving away from the point of minimum difference, thus leading to a large value of $d_k^{Avg}$. In this case, the division of $d_k^{min}$ by $d_k^{Avg}$ results in a smaller value of $r_k$, thereby emphasizing the similarity of the regions. Therefore, the match coefficient $r_k$ favors matches among high contrast features in the image region, and is a good detector of featureless and low contrast regions. At the extreme case, when two homogeneous regions of different intensities are being compared, $d_k^{Avg}$ and $d_k^{Min}$ are equal, resulting in $r_k=1$, which indicates a complete mismatch. If two homogeneous regions have similar intensities, $d_k^{Avg}$ and $d_k^{Min}$ will both be zero, and thus the match coefficient $r_k$ is set to one, indicating a complete mismatch.

Another reason why $r_k$ provides a better criterion for reassuring the degree of match than $d_k^{Min}$ is that the normalization process confines $r_k$ between the values of zero (indicating a perfect match) and one (indicating severe mismatch). This allows threshold parameters to be more easily selected independently of the other parameters such as image brightness and the size of the region.

Figure 4:
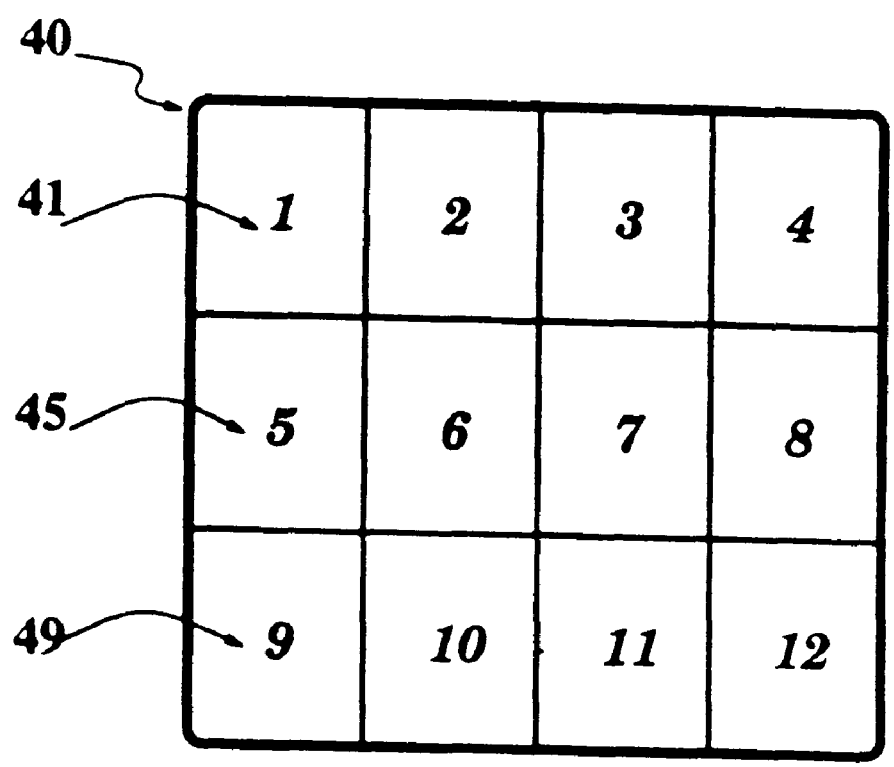
FIG. 4 shows one example of a frame subdivided into regions during the course of block matching.

The size of the regions into which the images are divided is an important consideration in determining the match coefficient $r_k$. While any number of regions may be chosen, the following factors may be taken into account. Small regions result in inaccurate motion estimates in homogeneous regions of the image. Very large regions, on the other hand, increase the possibility of generating poor matches since they are more likely to simultaneously contain a moving object and a portion of the background. In one example of the invention it has been found advantageous to employ twelve regions such as shown in FIG. 4.

The method of the invention set forth to this point determines a match coefficient $r_k$ for each block $B_k$ into which the images are divided. The next step (i.e., step 250 in the example of the invention shown in FIG. 2) of the method involves using these match coefficients $r_k$ to generate a single parameter indicating the similarity of the images being compared. This parameter is determined as follows.

Assume the images are divided into K regions. Let R be the set of all the K match coefficients $r_k$ corresponding to the K regions. That is, $$R = \{r_k, k=1, \ldots, K\}, \quad (6)$$

where the subscript k denotes the region number.

Let L be an ordered set of the elements of R, where the order is determined by the magnitude of the match coefficients. That is, there is a one-to-one correspondence between the elements of R and L, and, $$L=\{l_i, i=1, \ldots, K, \text{ such that } l_i \leq l_{i+1} \text{ for } i=1, \ldots, K-1\}. \quad (7)$$

In other words, L is the sorted version of R, where $l_1$ is the minimum match value (i.e., the best matching region), and $l_k$ is the maximum match value (i.e., worst matching region).

The instantaneous match (IM) signal is defined as, $$IMC = \frac{1}{S}\sum_{i=1}^{S} l_i, \quad (8)$$

where S<=K is a user selectable integer parameter which controls the number of regions of the image that contribute to the evaluation of the IM signal. For S=K, the value of the IM signal is just the average of all the match coefficients $r_k$ from all the regions. A value of S=1 selects only the match coefficient $r_k$ of the "best matching" region. In one example of the invention it has been determined that a value of S=4 (when K=12) generates good results.

Figure 5:
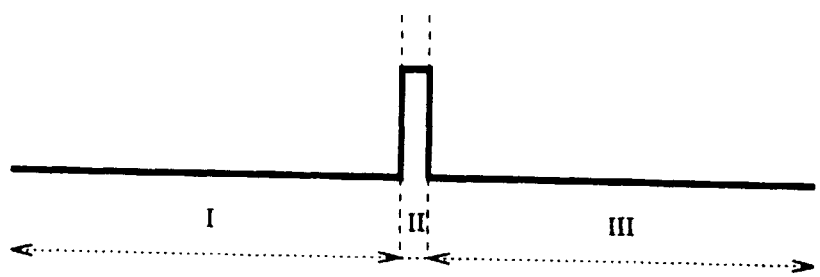
FIG. 5($a$) shows the behavior of the instantaneous match signal in the presence of an abrupt scene change.
Figure 5:
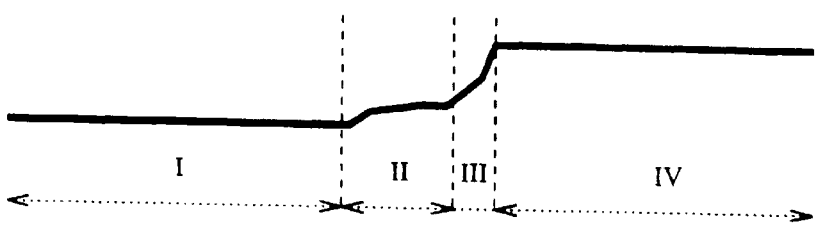
Figure 5:
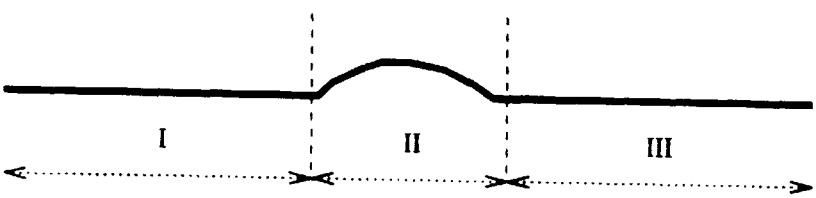

The instantaneous match signal IM as defined above is a good indicator of abrupt scene cuts. FIG. 5(a) shows a plot of the behavior of the IM signal during an abrupt scene change. Regions I and III represent different scenes in a sequence of frames while region II represents the transition between the two scenes and coincides with the 1st frame of the new scene. The IM signal is small within the individual scenes (i.e., regions I and III) because of the similarity among the frames that are being matched. Motion and other changes that occur in some regions from one frame to another do not cause an increase in the IM signal as long as there are at least a few good regional matches in the frames being compared. However, at the boundary between the two scenes (i.e., the left edge of region II) the IM signal is large and remains large as long as the frames being compared belong to different scenes.

FIG. 5(b) shows the behavior of the IM signal during a fade-out transition in region II. In region I, before fade-out occurs, the match value is small because of the relatively high contrast of the frames since the large values of $d_k^{Avg}$ result in small $r_k$ values. As the image contrast is reduced (i.e., fade-out occurs), the $d_k^{Avg}$ and $d_k^{Min}$ values decrease. However, $d_k^{Min}$ decreases at a lower rate. The net result in an increase in the IM signal in region II. This increase is proportional to the speed of fade-out. As the contrast decreases further, the values of $d_k^{Min}$ reach levels comparable to the level of noise in the image. At this point the values of $d_k^{Avg}$ decrease at an even higher rate than those of $r_k^{Min}$. Consequently, the IM signal increases in value in region III. Theoretically, the IM signal increases until it reaches a value of unity when the scene has completely faded-out. In practice, however, a value of unity is often not attained because of noise. Similar to fade-out, the gradual appearance of a new scene during fade-in causes a gradual decrease in the IM signal and a waveform similar to that for fade-out but in reverse order.

FIG. 5(c) shows the behavior of the IM signal during a simultaneous fade-out/in transition (i.e., a dissolve) between two scenes which occurs in region II. In this case the abrupt increase in the IM value which occurs during abrupt scene changes is replaced by a gradual increase followed by a gradual decrease. The highest value of the IM signal caused by a dissolve process is typically comparable to the values the IM signal assumes as a result of rapid motion occurring in a single scene. Therefore, if the IM detection threshold is lowered to a level which will detect a dissolve, it will also indicate an unacceptably large number of scene changes that in fact do not exist. Accordingly, the accurate detection of gradual transitions involving fade-in/out is more complex than the detection of abrupt scene changes and hence its analysis will be deferred until after abrupt transitions are discussed.

Detection of Abrupt Scene Transitions

Figure 6:
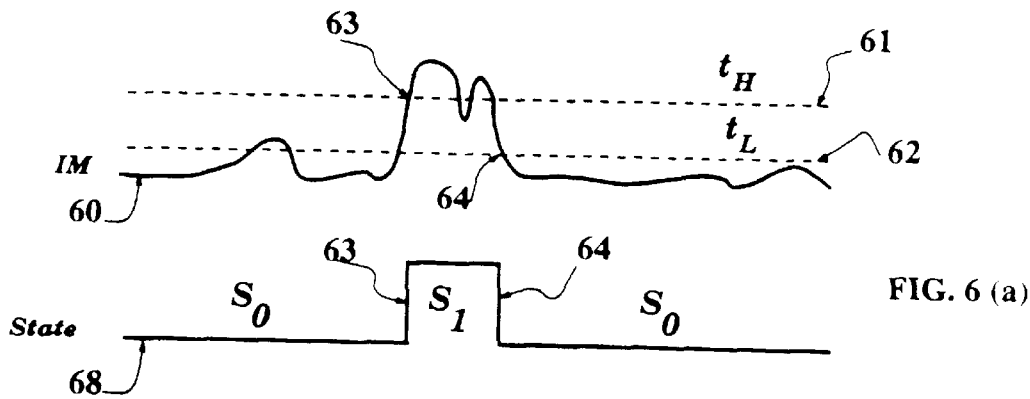
FIG. 6(*a*) shows the application of the two different threshold values to the instantaneous match signal and the resulting change in the state of the decision module.
Figure 6:
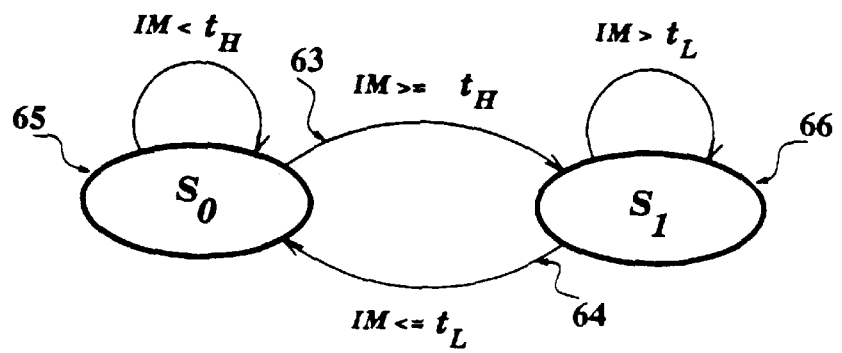
Figure 6:
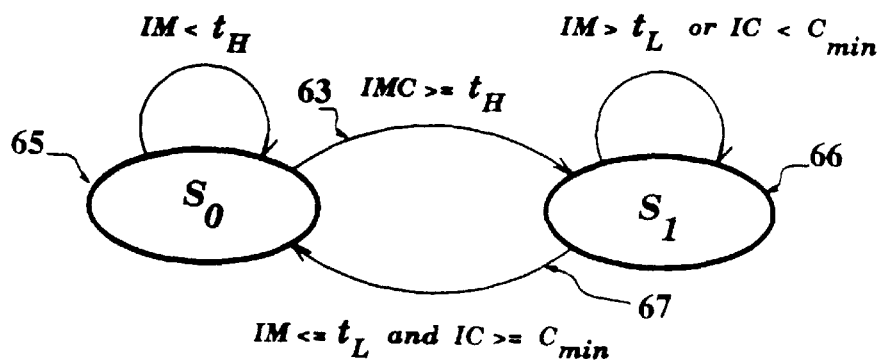

The above analysis of the IM signal indicates that abrupt scene changes, as well as those accompanied by either fade-in or fade-out (but not, as discussed below, fade-in/out) can be detected by determining when the IM signal undergoes a transition from a high value (i.e., above a predefined threshold $t_H$) to a low value (i.e., below a predefined threshold $t_L$). The detection of the IM signal can be achieved with a decision module utilizing a finite-state-machine as functionally illustrated in FIG. 6 which can be implemented in any known manner in the digital computer 7 shown in FIG. 1. The machine has two states $S_0$ and $S_1$. The transition between these states is determined by the IM signal. The machine is initially in state $S_0$ and remains in that state as long as the IM signal<$t_H$. The first occurrence of a value of the IM signal>=$t_H$ causes a transition from $S_0$ to $S_1$. The machine remains in that state for as long as the IM signal is greater than $t_L$. The first occurrence of an IM value below $t_L$ causes a transition back to state $S_0$. This transition back to state $S_0$ also marks the beginning of the new scene.

It should be noted that in the presence of abrupt scene changes, the transition from $S_1$ back to $S_0$ (i.e., 64 in FIG. 6[a]) is offset from the first frame of the new scene by one frame (when comparing consecutive frames). For applications in which it is important to find the exact location of an abrupt change, the exact location can be computed by subtracting this known fixed number from the location marked by this transition. The reason for using this transition rather than the transition from $S_0$ to $S_1$ (i.e., 63 in FIG. 6[a]), which coincides with the first frame of the new scene in the case of an abrupt scene change, relates to transitions involving fade-out, fade-in, and gradual changes which will be discussed below.

There are two major advantages to employing two different threshold values and sequential logic over a single threshold. First, the performance is improved when the IM signal fluctuates near a threshold value, thereby preventing the a series of very closely-spaced false detections from occurring. Second, the existence of two states corresponding to stable scene intervals and transition intervals allows the method to distinguish between the beginning and end of a scene transition. This allows the use of independent conditions for the transition between the two states, and as will be discussed below, and enables the method of the invention to detect and reject false scene changes usually from flash photography.

Detection in the Presence of Fade

When a transition between scenes involves fade rather than an abrupt transition, the IM signal reaches the $t_H$ level when the scene has sufficiently faded-out. This causes a transition of the finite-state machine from $S_0$ to $S_1$. The machine stays in state $S_1$ until a new scene appears (either in an abrupt manner or accompanied by fade-in), causing the IM value to decrease below the $t_L$ level. At this point a transition from $S_1$ back to $S_0$ marks the beginning of the new scene.

Certain applications of a scene change detector require that a "representative image" of the scene be retained at the beginning or end of a scene as measured by the detector. If a transition to a new scene is accompanied by fade-in, the IM signal can fall below $t_L$ before the contrast of the image has reached a level acceptable for a representative image. To overcome this problem an additional parameter, referred to herein as the image contrast (IC) signal, is employed. The IC signal is defined as, $$IC = \text{Maximum}(d_k^{Avg})|_{k=1}^K. \quad (9)$$

The IC signal provides a good measure of the difference in brightness between adjacent portions of a frame. This parameter signal is a by-product of the matching process, and can be determined without any additional computation. To incorporate the IC signal into the detection process requires that an additional condition be imposed on the transition from $S_1$ to $S_0$. Specifically, the IC signal should be greater than or equal to a predetermined contrast parameter $C_{min}$, as indicated in FIG. 6(c).

When the previous scene fades out and the succeeding scene fades-in, no well-defined end or starting point exists. Moreover, in most cases a number of dark frames may be present between the end of the old scene and the beginning of the new scene which do not belong to either scene. This results in a transition period consisting of many frames. The duration of the transition period in such cases is reflected in the length of time that the finite-state-machine stays in state $S_1$. This information can be used to discriminate between abrupt and gradual changes.

Detection of Dissolve and Other Gradual Transitions

Unlike abrupt scene changes such as those produced by butt-editing, which cause abrupt and pronounced changes in the IM signal, gradual transitions between scenes cause slow and small changes in the value of the IM signal. As previously discussed, the class of gradual scene changes involving fade-out and fade-in can be detected by taking advantage of the intensity change, the sensitivity of the IM signal to low contrast regions, and by providing an image contrast (IC) signal. However, the methods set forth above may nevertheless fail to detect the class of gradual scene changes involving dissolves.

Dissolves are difficult to detect for a number of reasons. First, because a dissolve occurs over several frames, the level of mismatch between the last several frames of the old scene and the first several frames of the new scene is distributed over the number of frames in which the dissolving process takes place. This is depicted in FIG. 5(c). During dissolves the gradual loss of intensity of the old scene (i.e., fade-out) is accompanied by the gradual increase in the intensity of the new scene (i.e., fade-in). Consequently, the total rate of temporal change in the intensity of the blended frames is much lower than the change that occurs for individual fade-out and fade-in transitions which take place over the same number of frames.

Because a gradual scene change occurs over two or more frames, it is often advantageous to compare frames that are spaced apart a predetermined number of frames in the sequence rather than to compare adjacent frames because the change between any two adjacent frames may be too small to detect. It should be noted that this does not suggest a reduction in the rate at which frames are compared. Rather, the frames are still compared at the rate at which they are received (e.g., 30 frames per second for standard NISC video), except that each frame is compared with the frame which came D time units earlier, where D is the predetermined number of frames between those that are compared. This process, which is referred to herein as delayed-frame-comparison (DFC) (performed in step 230 in the example of the invention shown in FIG. 2), is indicated in FIG. 7, which shows the use of motion estimation in the presence of DFC.

Figure 7:
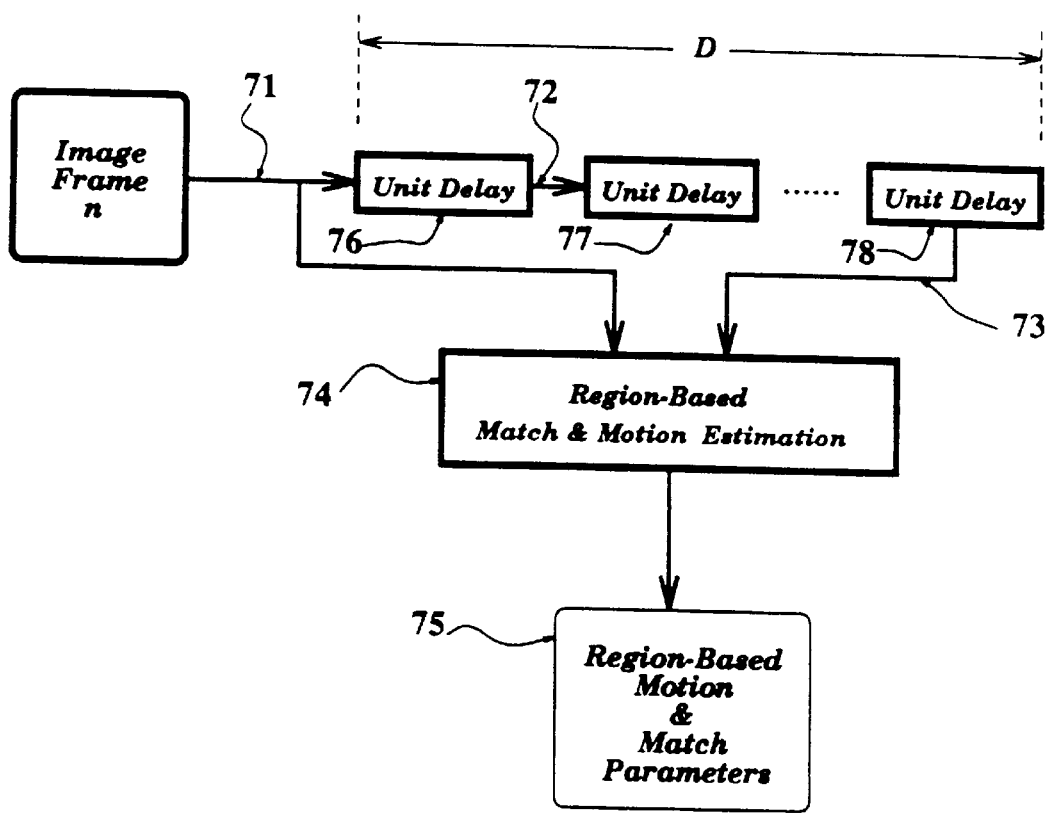
FIG. 7 is a block diagram illustrating the steps involved when comparing each frame with its Dth previous frame.

As FIG. 7 indicates, the current frame 71, is presented as one input of the region-based match and motion estimation block which performs block matching between two frames. At this time, the previous frame 72 is present at the output of the first delay element 76, the Dth previous frame 73 is present at the output of the Dth delay element 78, which is presented as the second input to the matching block 74. These two frames are operated on by block 74 to generate the region based motion and match parameters. At the next frame time, a new frame appears at 71, the previous frames shift from the input of the unit delay blocks 76,77, . . . , 78 to their respective outputs, and the new set of match and motion parameters are determined.

As a result of performing a delayed-frame-comparison, the match coefficients will reflect the accumulated change in the contents of the frames which occurred over D frame times. The effect of this accumulation is to amplify the value of $r_k$ and hence the IM signal.

The use of delayed-frame-comparison is also advantageous because it improves the signal-to-noise ratio of the IM signal. This improvement occurs because the noise levels remain constant while the disparities between the frames are amplified for D>1. As a result, very small disparities, which when observed over one frame time are not distinguishable from noise, become distinguishable.

While delayed-frame-comparison does not affect the amplitude of the IM signal for abrupt changes, it does result in an increase in the time over which the signal assumes a larger value from one frame time (when consecutive frames are compared) to D frame times (since the first D frames of the new scene are compared with the last D frames of the previous scene). When combined with the motion-controlled temporal filtering method discussed below, delayed-frame-comparison yields an improvement in the detection of abrupt transitions between rather similar scenes.

It should be noted that when using delayed-frame-comparison with a delay of D to detect abrupt scene changes, the point marked by the transition from $S_1$ to $S_0$ is offset from the first frame of the new scene by D frames. This is because the first D frames of the new scene are compared with frames from the old scene. As a result, the magnitude of the IM signal does not fall below the $t_L$ threshold until the end of the Dth frame. For applications in which the exact location of scene transition is needed, it can be obtained by moving backward by D frames the position denoted by the state transition.

Motion-Controlled Temporal Filtering

Because gradual scene changes are characterized by low amplitude, long duration increases in the IM signal, it is advantageous to employ a detection scheme based on the observation of the IM signal over an extended period of time. This can be accomplished by identifying those portions of the IM signal which undergo a relatively small but sustained increase in amplitude over a number of frames. However, there are other factors, such as motion that may occur in the contents of the frames, which can also cause a small, sustained increase in the amplitude of the IM signal. Accordingly, it is necessary to distinguish between actual scene changes that occur gradually while avoiding false detections caused by things other than a gradual transition.

To accurately detect gradual scene changes such as dissolve while rejecting the detection of motion-related events that may be confused for a gradual scene change, the present invention employs temporal filtering of the IM signal (in step 260 in the example of the invention shown in FIG. 2) in connection with a motion detection module.

Figure 8:
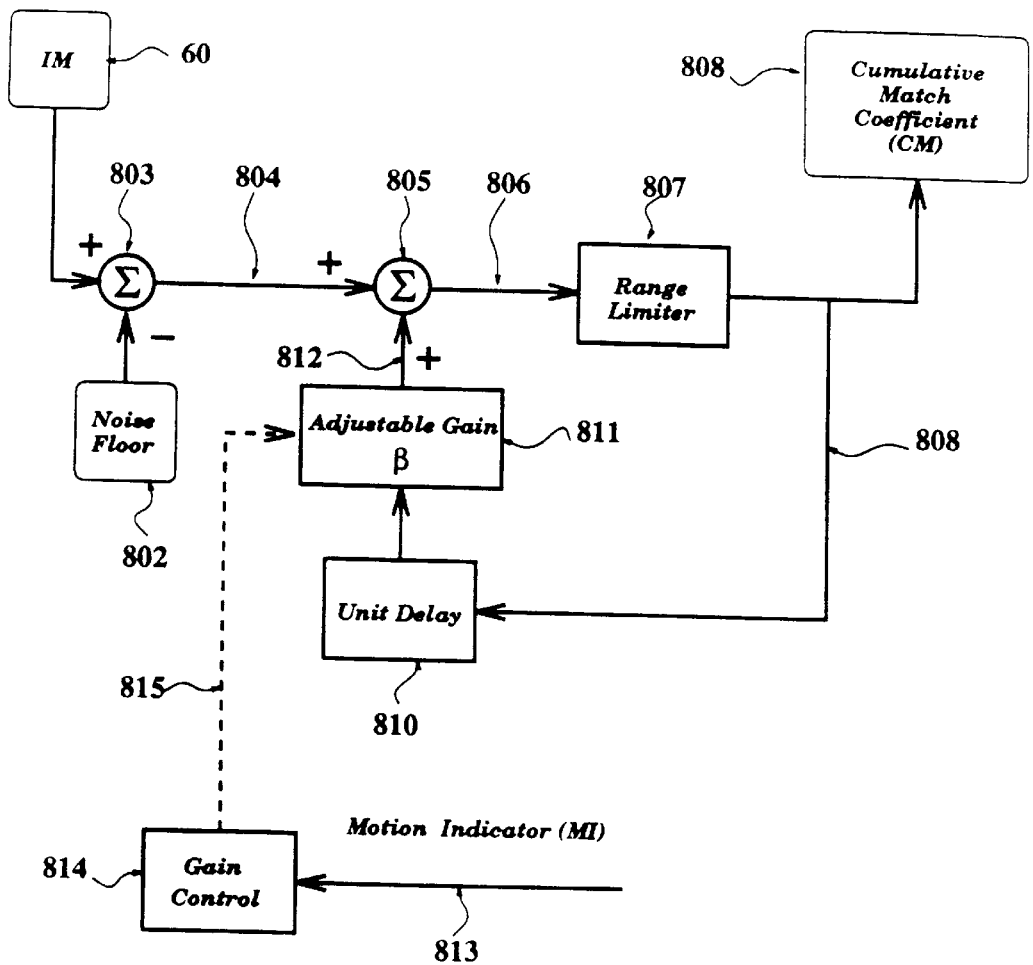
FIG. 8 is a diagram of a motion-controlled digital filter used to determine the cumulative match signal from the instantaneous match signal.

The apparatus for performing the step of temporally filtering the IM signal is indicated in block form in FIG. 8. This apparatus processes the IM signal 60, and generates a new signal which will be referred to as the Cumulative Match signal (CM) 808. At every frame time, the new value of CM is computed by passing the value of the CM signal during the previous frame time (which is present at the output of the unit delay 810) through a multiplier with an adjustable gain beta, 811, to generate a new value 812, and adding it to the current adjusted value of the IM signal using an adder 805. The portion of the apparatus consisting of the unit delay 810, multiplier 811 having a positive gain between zero and one, and adder 805, form a first order infinite-impulse-response (IIR) digital filter, which in effect functions as an integrator with decay. In order to prevent the accumulation of low-level noise which may be present in the IM signal, and to control the level above which increases in the magnitude of IM signal are considered significant, a constant value referred to as the noise floor, 802, is subtracted from the IM signal using adder 803 prior to the introduction to the input of the digital filter. A range limiter 807 is employed at the output of the adder to limit the output of the digital filter between the values of zero and one. The range limited serves to prevent the output from getting too large or negative during extended periods in which the noise-floor-subtracted IM signal 804 either assumes relatively large values or is negative (due to the IM signal being below the noise floor).

The temporal filter set forth above detects sustained increases in the IM signal when the gain beta is set to a value close to (and smaller than) one. However, to prevent motion-related increases in the IM signal from accumulating and resulting in a false detection, the characteristic of the digital filter is altered when certain prescribed classes of motion are present in the sequence of frames. This is accomplished by the gain control block 814 by reducing the gain beta to a very small value (close to or equal to zero). This in effect prevents the temporal accumulation of the IM signal. Setting beta equal to zero results in the noise-floor-subtracted signal 804 passing unaltered through the filter to generate an identical CM signal. As beta increases towards one, the sensitivity of the CM signal to sustained low-level values of the IM signal which are above the predetermined noise-floor increases.

The task of reducing the gain beta may be performed by a Motion Indicator (MI) signal. This is a binary signal which assumes only values of zero and one. When the IM signal is set to zero, the gain control block adjusts the gain beta to a value smaller than but close to one (e.g., 0.85 in one example), thus allowing the detection of gradual scene changes. When certain motion-related conditions are met, the IM signal is set to one. As a result, the gain control block sets beta to zero, thus altering the characteristic of the digital filter so that the input signal is passed through without accumulation.

As discussed above, the value of the IM signal depends on the subset S of the K regional match coefficients that are selected for processing. Therefore, the existence of motion in the remaining K-S regions of the image which do not contribute to the IM value is of no consequence to the detection process. The detection process only analyzes the motion that occurs in the S regions. Since the step of setting MI signal to one inhibits the detection of gradual scene changes, several steps are taken to prevent unnecessary inhibition of gradual scene change detection. While a number of different criteria may be employed to prevent the inhibition step, the following considerations have been found to be particularly relevant.

First, regions having a match coefficient $r_k$ that fall within either of two extreme ranges are excluded from determining the value of the motion indicator signal. One extreme range corresponds to very small values below a threshold denoted by $r_{low}$, which is in the vicinity of the noise-floor. These values do not contribute to the CM signal despite the temporal filtering process. Moreover, as discussed below, once the MI is set to one, it will remain at one for a finite period of time even if the conditions that initially caused it to be set to one no longer exist. Therefore, small values of the match coefficient $r_k$ are prevented from setting the MI signal to one to prevent the possibility of missing a prominent gradual scene change.

The other range excluded from the determination of the value of the MI signal corresponds to values of the match coefficient $r_k$ that are above a threshold denoted by $r_{high}$. The values of $r_{high}$ above the $t_H$ value (discussed above) which would result in a detection even without the temporal filtering. For each of the S regions, the value of the match coefficient is checked to see if it falls between the two thresholds $r_{low}$ and $r_{high}$. Any region having a match coefficient $r_k$ that does not fall between $r_{low}$ and $r_{high}$ is eliminated from further processing.

In the next step, each region having an $r_k$ value which has not been eliminated is examined for the presence of motion. If the length of the motion vector for the region is greater than or equal to a predetermined threshold (denoted by $\text{Motion}_{thresh}$), the region is marked.

Finally, if the number of marked regions is greater than or equal to a predetermined number (denoted by $\text{Motion}_{count}$), the MI signal is set to one for the next $n_M$ time units. By setting the MI signal to one for several frames, rather than just the single frame in which the motion has been detected, the filtering process is altered during time periods for which motion detection cannot be reliably performed between every pair of frames. This condition usually exists during time intervals for which the scene being detected has a large number of relatively small regions (with respect to the rectangular image regions) that are moving erratically. By maintaining the motion indicator signal at one for several frames (e.g., five in one example of the invention) each time motion is detected, the filtering step is inhibited during the few intermediate frames when reliable motion detection is not possible.

Detection Using the Cumulative Match Coefficient

Figure 9:
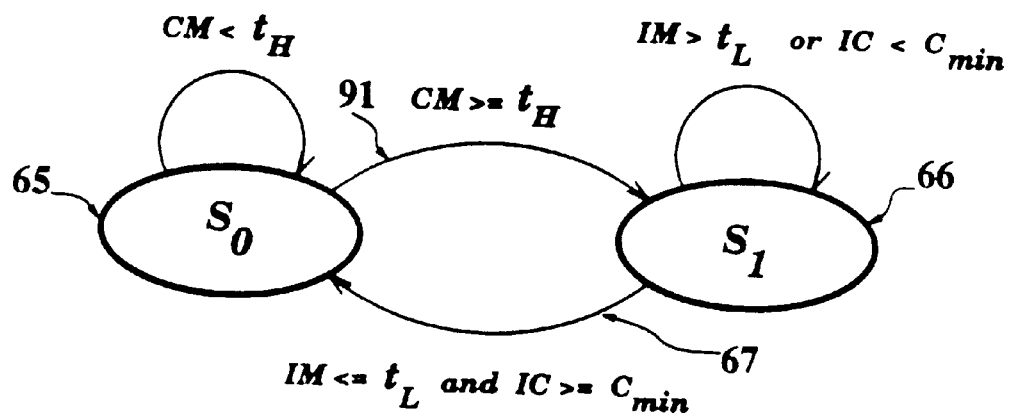
FIG. 9 is a state diagram for a complete decision module utilizing the cumulative match signal, the instantaneous match signal, and the image contrast signal.

To detect gradual scene changes, the finite-state-machine discussed above (see FIG. 6(c)) for abrupt transitions must be modified to take advantage of the motion-controlled temporal filtering step. FIG. 9 is a state diagram illustrating the criteria used in step 270 of the example of the invention shown in FIG. 2 when employing temporal filtering. As the figure indicates, the CM signal replaces the IM signal for the transition from state $S_0$ to $S_1$, while the conditions for the transition from $S_1$ to $S_0$ remain the same as before, and are a function of the IM signal and the image contrast signal.

The operation of the finite state machine employing the CM signal is as follows. Initially, the finite-state-machine is in state $S_0$ and it remains in that state as long as the CM signal is less than $t_H$. The value of $t_H$ is adjusted to account for the subtraction of the noise-floor constant from the IM signal. As a result, while the gain of the temporal filter is set to zero, the CM signal is equal to the noise-floor-subtracted IM signal and the finite state machine operates as discussed above. However, the sensitivity of the CM signal to gradual transitions when the gain of the temporal filter is adjusted properly allows the CM signal to reach the $t_H$ threshold while the IM signal may have a value too low to reach this threshold. As a result, the CM signal causes a transition from $S_0$ to $S_1$. The criteria for causing a transition from $S_1$ to $S_0$ are the same as discussed above. Accordingly, the IM value is compared to the $t_L$ threshold to ensure that the new scene has stabilized (i.e., $IM<=t_L$). The image contrast (IC) signal is also used to ensure that the image contrast has reached an acceptable level during fade-in. The transition from $S_1$ to $S_0$, which indicates the beginning of a new scene, also causes the gain beta to be set to zero for the duration of one frame, thereby lowering the value of the CM signal to the present value of the noise-floor-subtracted IM signal. This removes the effects of the scene change from the CM signal to allow the temporal filter a fresh start while operating on the new scene.

The present invention achieves a number of advantages when both the steps of delayed-frame-comparison and motion-controlled temporal filtering are employed. First, these steps allow the method of the invention to detect dissolves and many other gradual transitions that can occur between scenes. Second, these steps substantially increase the sensitivity of the method when detecting slow fade-outs which cause only a small increase in the IM signal because the small increase is amplified in the CM signal. In addition, the detection of abrupt transitions between relatively similar scenes is also enhanced. In this case, the similarity of the corresponding regions of the frames near the transition may produce an IM signal having a magnitude that falls below the $t_H$ threshold. As a result, the transition may go undetected. However, as noted above, by performing delayed-frame comparison the temporal extent of the signal is increased from one frame time to D frame times. This increase allows sufficient time for the temporal filtering step to generate a CM signal having an amplitude above $t_H$. Accordingly, such transitions that would otherwise be missed can be detected.

Figure 10:
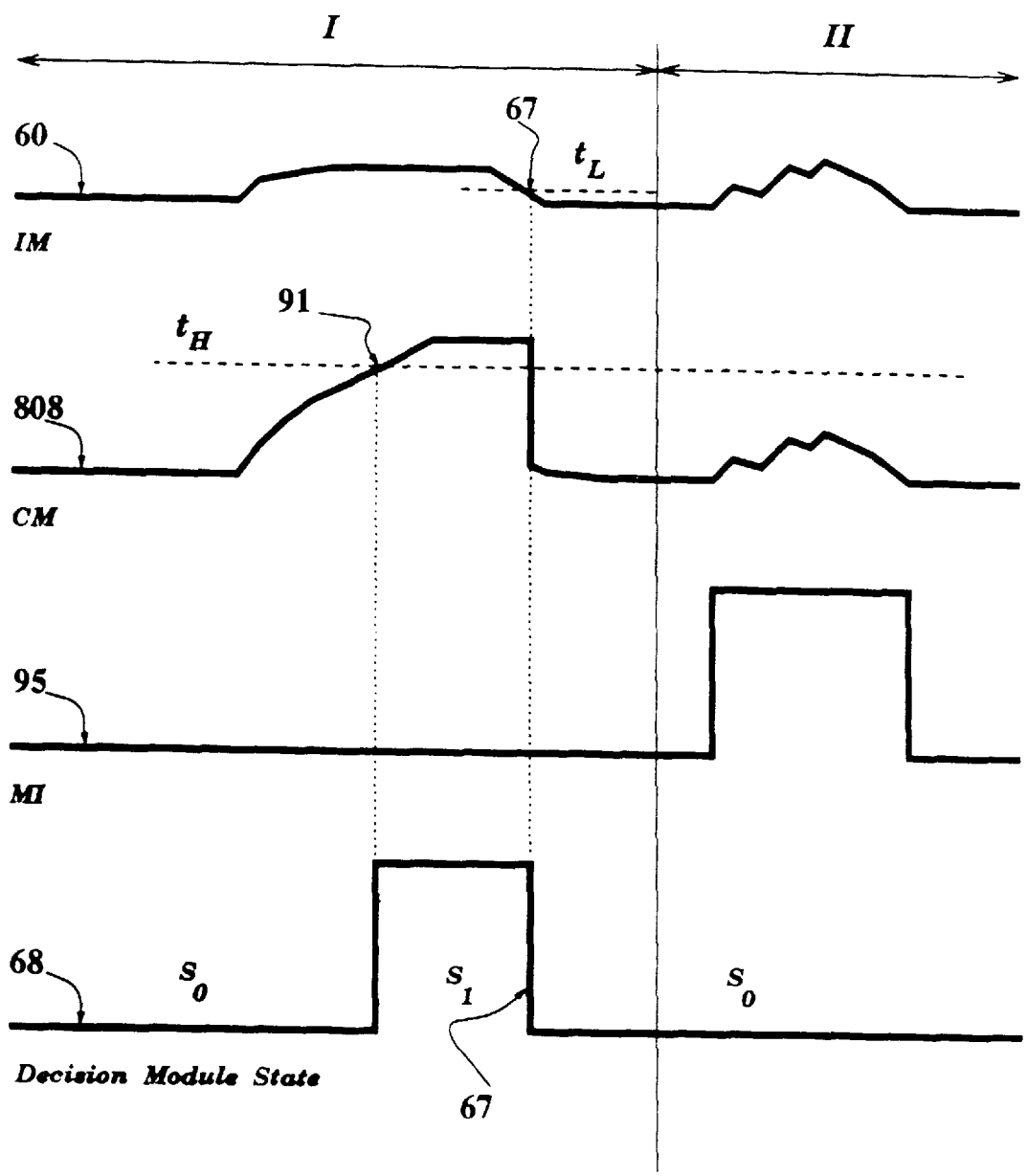
FIG. 10 is an example of the output signals produced by the scene change detector of the present invention which shows the instantaneous and cumulative match signals, the motion indicator signal, and the resulting state change leading to a scene change detection.

FIG. 10 illustrates typical waveforms of the various signals when the method of the invention is used to detect gradual transitions (region I) and erratic motion present in the frames (region II). The IM signal 60 exhibits a sustained, low-level magnitude increase in region I. Motion-controlled temporal filtering of the IM signal 60 occurs when the motion indicator signal MI is set to zero, causing an increase in the value of the CM signal 808 to above the predetermined $t_H$ value at 91. As a result the finite-state machine undergoes a transition from state $S_0$ to $S_1$. When the end of the gradual scene change is detected, there is a decrease in the magnitude of the IM signal to a value below the $t_L$ threshold at 67. Consequently, the finite-state machine returns to state $S_0$, thus indicating the beginning of a new scene. This also lowers the CM signal to the present value of the IM signal. The rightmost portion part of FIG. 10 (region II) shows an increase in the value of IM due to erratic motion. In this case the MI signal is set to one and the temporal filtering process is altered. As a result, the CM value 808, which is equal to the noise-floor removed IM signal, is below $t_H$, and thus a false detection is avoided.

Rejection of Camera-Flash-Induced Scene Changes

If camera light-bulbs such as those used in still-frame photography are flashed while a video recording of the same event is being made, the flash may cause a false scene change to be detected. This false detection occurs because of the sudden and substantial increase in the image intensity. Previous work on the subject Nagasaka A., and Tanaka Y., "Automatic Video Indexing and Full Video Search for Object Appearances," Proc. 2nd working conference on visual database Systems (Visual Database Systems II), E. Knuth and L. M. Wenger Editors, Elsevier Science Publishers, pp. 113–127, assumes that such intensity changes usually affect no more than half of the frame. However, this assumption is correct only in special cases. These cases are those in which a large portion of the scene (i.e., in Nagasaka et al., half the scene) is sufficiently remote from the source of flash to be unaffected by it.

However, when the majority of the objects in the scene are close to the source of illumination, the entire image can experience a sudden increase in intensity during the flash. In such cases the prior methods will falsely detect a scene change. In contrast, the present invention can successfully reject such false scene changes by employing the step of delayed-frame-comparison. The rejection process is based on the limited duration of the flash as measured by the number of frames times the time the finite-state-machine remains in state $S_1$ before the transition back to $S_0$. This interval is referred to as the transition interval.

Consider the case in which the IM signal is computed by comparing consecutive video frames (i.e., no delayed-frame comparison). In this case an abrupt scene change will cause a sudden increase in the amplitude of the IM signal when the first frame of the new scene is compared with the previous frame which belongs to the prior scene. This in turn produces a CM value which is above $t_H$, causing a transition of the finite-state-machine from $S_0$ to $S_1$. At the next frame time, the new frame is compared with the previous frame which belongs to the same scene. As a result of the good match, the amplitude of the IM signal is reduced, thus causing a transition from $S_1$ to $S_0$. Therefore, in this case the duration of the transition interval is one frame time.

If a camera bulb now flashes during a single frame of the same scene, a comparison of consecutive frames results in a transition interval of length two. This is because the IM signal assumes a large amplitude during the two consecutive frame times in which the high intensity frame (i.e., the frame during the flash) is being compared with the frames immediately preceding and succeeding it. Since some gradual scene changes may also have a transition interval of two frames, it is not possible in this case to distinguish between a camera flash event and a gradual scene change based on the length of the transition interval.

If the detection method now utilizes the delayed-frame-comparison with a delay of D frame times, abrupt scene changes will have a transition interval of D frame times (since the first D frames of the new scene are compared with the last D frames of the previous scene). Gradual scene changes will have a longer transition interval. However, a flash event will be characterized by two transition intervals of length one. The first transition occurs during the comparison of the high intensity image with the Dth frame preceding it. The second transition occurs during the comparison of the high intensity image with the Dth frame following it. The two transitions are separated by D frame intervals. Thus, the flash event can be detected based on the unit length of the transition interval. As a result, the flash event will not cause a false detection.

The above discussion concerning the rejection of false scene changes was described in terms of single frame mismatches caused by flash photography. However, the rejection process may be applied equally well to any other source of noise which produces a single frame having a high level of mismatch with the preceding and succeeding frames.

I claim:

1. A method of determining scene changes in a sequence of visual information-bearing frames, comprising the steps of:

(a) dividing a first digitized frame into a first plurality of regions and a second digitized frame into a second plurality of regions that respectively correspond in location to the first plurality of regions;

(b) block-matching the regions of the first digitized frame to the regions of the second digitized frame to produce regional match signals that represent a likelihood that the regions of the first digitized frame contain visual information substantially similar to respective matching regions of the second digitized frame;

(c) ordering, to obtain an ordered sequence, the regional match signals beginning with a best regional match signal defining a best match and ending with a worst regional match signal defining a worst match;

(d) averaging together a predetermined number of the regional match signals that are selected in the ordered sequence of step (c) beginning with the best match signal, to obtain an instantaneous match (IM) signal, said IM signal providing a criteria for determining whether the first digitized frame represents a scene different from a scene represented by the second digitized frame; and (e) indicating a scene change when the IM signal meets a predetermined decision criterion.

2. The method of claim 1 wherein said first and second digitized frames define a first pair of frames and further comprising the step of:

(f) repeating steps (a)–(d) a plurality of times for a sequentially chosen plurality of pairs of frames of a sequence of frames.

3. The method of claim 2 further comprising the step of temporally filtering a plurality of IM signals before the step of indicating a scene change.

4. The method of claim 3 in which the filtering step comprises the step of subtracting a constant noise value from the IM signal.

5. The method of claim 4 wherein the step of temporally filtering the IM signals comprises the step of temporally filtering the IM signals with an infinite-impulse-response digital filter having a variable gain and a range limiter.

6. The method of claim 3 further comprising the step of varying the gain during the step of temporally filtering the IM signals in response to a predefined condition.

7. The method of claim 6 wherein the predefined condition is a function of a regional match signal and a motion vector.

8. The method of claim 7 wherein the regional match signal is the ratio of a minimum block matching error to an average value of the block matching error.

9. The method of claim 3 wherein the regional match signal for each of the regions of the first digitized frame and the second digitized frame upon which block matching is performed is the ratio of a minimum block matching error to an average value of the block matching error.

10. The method of claim 3 wherein the step of temporally filtering the IM signal produces a cumulative match CM signal and the step of indicating a scene change includes the step of indicating a scene change when both the IM and the CM signals meet certain decision criteria.

11. The method of claim 10 wherein each frame has a contrast value associated therewith, and further comprising the step of determining an image contrast (IC) signal representing the contrast value associated with at least one frame of the pair of frames; and indicating a scene change when the IM, the CM, and the IC signals meet certain decision criteria.

12. The method of claim 1 wherein the regional match signal for each of the regions of the first digitized frame and the second digitized frame upon which block matching is performed is a ratio of a minimum block matching error to an average value of the block matching error.

13. The method of claim 1 wherein the first digitized frame is divided into K regions and further comprising the step of:

(f) repeating steps (c) and (d) for each of said K regions to obtain K minimum values and K normalized minimum values respectively corresponding to the K regions.

14. The method of claim 13 further comprising the steps of:

(g) ordering by magnitude the K normalized minimum values, beginning with a smallest normalized minimum value and ending with a largest normalized minimum value;

(h) calculating an instantaneous match (IM) signal having a value determined by selecting and averaging together a first S of the K ordered normalized minimum values, where $S \leq K$ and is user definable, said IM signal providing a criteria for determining whether the first digitized frame belongs to a scene different from the second digitized frame.

15. The method of claim 14 wherein said first and second digitized frames define a first pair of frames and further comprising the steps of:

(i) repeating steps (a)–(h) a plurality of times for a sequentially chosen plurality of pairs of frames of a sequence of frames in place of the first pair of frames to calculate a plurality of values of the IM signal such that said IM signal provides a criterion for determining whether one frame of one of the pairs of frames belongs to a scene different from another frame of the pair of frames.

16. The method of claim 15 further comprising the step of:

(j) preselecting an upper threshold value and a lower threshold value of the IM signal such that a change in the value of the IM signal to a value below the lower threshold value after having been above the upper threshold value at a previous time corresponds to a scene change at the point in the sequence between the pair of frames at which the IM signal changed from the value above the upper threshold value to below the lower threshold value.

17. The method of claim 15 further comprising the step of temporally filtering said IM signal with a digital filter having a variable gain to generate a cumulative match signal, said cumulative match signal providing a criterion for determining whether a scene change has occurred over a plurality of frames.

18. The method of claim 17 further comprising the step of subtracting a constant noise value from the IM signal before the step of temporally filtering the IM signal.

19. A method of determining scene changes in a sequence of visual information-bearing frames, comprising the steps of:

(a) digitizing at least first and second frames of the sequence;
(b) dividing the first frame into a first plurality of regions and the second frame into a second plurality of regions respectively corresponding in location and size to the first plurality of regions of the first frame;
(c) block-matching by
  (i) determining values of a first match distance between a first region of the first plurality of regions and a plurality of regions of the same size as said first region within a portion of the second frame encompassing the corresponding region in the second frame; and
  (ii) finding a minimum value among said values, said minimum value corresponding to the location of a matching region of the second frame that is defined relative to the location of the corresponding region in the first frame, said matching region being a region of the second frame most likely to contain visual information substantially similar to the first region of the first frame;
(d) calculating an average value of all the values of the first match distance and normalizing the minimum value of the first match distance by dividing said minimum value by said average value to obtain a normalized minimum value, said normalized minimum value representing the likelihood that the matching region contains information substantially similar to the first region of the first frame.

20. The method of claim 19 further comprising the step of:
generating a motion vector, said motion vector equalling a distance defined by the location of the matching region relative to the location of the corresponding region of the second frame.

21. The method of claim 19 wherein said first and second frames are consecutive frames in the sequence.

22. The method of claim 19 wherein said first and second frames are spaced apart a predetermined number of frames.

23. The method of claim 22 further comprising the step of detecting single frame noise.

24. The method of claim 23 wherein the single frame noise is produced by a camera flash.

25. A method of determining scene changes in a sequence of visual information-bearing frames, said method comprising the steps of:
comparing in a sequential order a plurality of pairs of frames to generate an instantaneous match (IM) signal representing a similarity between the frames of each pair;
temporally filtering the IM signal to generate a cumulative match (CM) signal; and
indicating a scene change when the IM signal and the CM signal meet a predetermined decision criterion.

26. Apparatus for determining scene changes in a sequence of visual information-bearing frames, comprising:
means for comparing in a sequential order a plurality of pairs of frames to generate an instantaneous match (IM) signal representing a similarity between the frames of each pair;
means for temporally filtering the IM signal to generate a cumulative match (CM) signal; and
means for indicating a scene change when the IM signal and the CM signal meet certain decision criteria.

27. Apparatus for determining scene changes in a sequence of visual information-bearing frames, comprising:
(a) means for dividing a first digitized frame into a first plurality of regions and a second digitized frame into a second plurality of regions that respectively correspond in location to the first plurality of regions;
(b) means for block-matching the regions of the first digitized frame to regions of the second digitized frame to produce regional match signals that represent a likelihood that the regions of the first digitized frame contain visual information substantially similar to respective matching regions of the second digitized frame;
(c) means for ordering the regional match signals beginning with a best regional match signal defining a best match and ending with a worst regional match signal defining a worst match;
(d) means for averaging together a predetermined number of the best regional match signals that are selected in the ordered sequence obtained by said ordering means, beginning with the best match signal, to obtain an instantaneous match (IM) signal, said IM signal providing a criteria for determining whether the first digitized frame represents a scene different from a scene represented by the second digitized frame; and
(e) means for indicating a scene change when the IM signal meets a predetermined decision criterion.

* * * * *